Patented Jan. 15, 1946

2,392,952

UNITED STATES PATENT OFFICE 2,392,952

PRODUCTION OF RESIN ALCOHOLS

Otto Schmidt, Ludwigshafen-on-the-Rhine, Germany, assignor, by mesne assignments, to General Aniline & Film Corporation, New York, N. Y., a corporation of Delaware No Drawing. Application August 2, 1935, Serial No. 34,382. In Germany April 7, 1930

20 Claims. (Cl. 260—100)

This application is a continuation-in-part to my application, Ser. No. 527,060, filed April 1st, 1931.

The present invention relates to the reduction of resin acids and certain derivatives thereof to alcohols or mixtures essentially consisting of or containing preponderating quantities of the said alcohols.

I have found that in resinous substances, such as resin acids or products containing the same, such as abietic acid, colophony or the derivatives of the said acids, for example abietic acid esters, such as abietic acid methyl ester the free or combined carboxylic groups can be reduced to alcoholic groups by treating the said compounds in the liquid state at an elevated temperature with hydrogen in the presence of hydrogenation catalysts at a pressure of at least 30 atmospheres preferably 100 or more atmospheres until the saponification value of the initial materials is considerably diminished. In order to obtain good results it is usually necessary to work under energetic conditions at increased temperatures, such as more than 120° C., preferably at 180° C. or more.

An efficient activation of the catalysts can be obtained by a very fine disintegration of the catalytic substances, for example by employing the catalytic substances alone in a very finely divided form, or by depositing the catalytic substances on large surface carriers, such as fibrous asbestos, powdered graphite, silica gel or inert metal powders and the like, and/or by adding to the catalytic substances one or more activating substances. Suitable catalytic substances are for example the base metals, copper, nickel, iron, cobalt, or silver or mixtures thereof and they may be prepared from their salts, oxides or other compounds, if desired prior to or after an incorporation with activating substances. Compounds of metals which are converted into the metals during the operation may be also employed, as for example salts of cobalt with any organic carboxylic acid. The activating substances may be chosen from compounds of the solid metallic elements of the 1st to 7th groups of the periodic system, as for example from compounds, especially oxygen-containing compounds, such as hydroxides, oxides, carbonates, phosphates, silicates, nitrates, or also cyanides, complex compounds, as for example iron-cyanides and the like, of the alkali or the alkaline earth or rare earth metals, such as potassium, sodium, calcium, barium or magnesium, lanthanum, thorium, cerium and zirconium, further boron and particularly from compounds of the metals giving acids with oxygen, such as chromium, molybdenum, tungsten, uranium, manganese, vanadium or titanium or mixtures thereof as well as salts of the metal acids or several of these compounds. The metals forming acids with oxygen may be employed in the form of the alkali metal, alkaline earth metal or rare earth metal salts of the said acids or in the form of their salts with the hydrogenating metals, as for example copper, nickel, cobalt, iron, silver or zinc vanadates, molybdates, manganates, uranates, tungstates and the like and in this case the said hydrogenating metals must not be present as such. The solid metals of the 2nd to 4th groups of the periodic system, as for example zinc, cadmium, tin, and aluminium, may also be employed in the free state for activating purposes, the said cheap and easily available metals being preferred. The order of mixing the aforesaid single components is usually not important and, as already stated, the activating substances may be mixed with compounds of the hydrogenating metals, whereupon the whole mass is subjected to a treatment with hydrogen, whereby reducible compounds of the hydrogenating metals are converted wholly or at least partially into the free metals. Otherwise the components may be mixed for example in a melt of fusible activating substances, such as alkali metal compounds, to which the hydrogenating metals or the compounds are added. In cases when compounds are to be hydrogenated which still contain catalyst poisons, catalysts immune from poisoning, as for example those containing molybdenum or its compounds alone or in admixture with other substances may be employed.

By suitably selecting the catalyst as well as the reaction temperature and the pressure the reduction can be carried either to a well defined stage, i. e. to the formation of products which contain alcoholic groups or preferably even to products in which the double bonds contained in the molecule of the resin acids are also wholly or partially hydrogenated, the hydrogenation of the double linkages usually taking place first during the hydrogenation.

The efficiency of the catalyst employed, however, depends to a large extent on whether a carrier or other additions are employed. Thus, for example, a catalyst consisting of nickel and activated with chromium provides a most energetic reduction when working in the liquid phase. Catalysts prepared from cobalt with additions of a basic nature, such as alumina, magnesia or potassium hydroxide are particularly suitable for the production of alcohols.

The temperatures employed depend, generally speaking, on the nature of the material under treatment and its volatility; temperatures between 180° and 350° C. are usually employed but the invention is not restricted to this range. For the reduction of the carboxyl groups into alcoholic groups temperatures between about 200° and 300° C. are advantageously employed. If catalysts of copper be employed the temperatures may be somewhat higher as compared with those suitable when working with cobalt and nickel catalysts. The optimal reaction temperature for the production of alcohols depends on the nature of the initial material and on the nature of the catalyst employed.

Pressures of preferably from 100 to 300 atmospheres, or still higher pressures, such as up to 400 or 500 atmospheres, will be applied; the application of higher pressures usually shortens the period of time required for the reaction. Thus, for example, abietic methyl ester can be reduced to the corresponding alcohol at a pressure of 300 atmospheres in about half the time required when working at a pressure of 200 atmospheres under otherwise equal conditions of working. The period of time required for carrying out the process also depends on the manner in which the hydrogen is introduced, and on the homogeneous dispersion of the catalyst within the initial material; intimately stirring and/or spraying the mixture of initial material and catalyst into the reaction vessel provides for most satisfying results. The process may be carried out continuously or intermittently in any usual and convenient manner.

In the place of pure hydrogen gaseous mixtures containing the same may also be employed, the hydrogen being diluted for example with steam or alcohol vapor, or with nitrogen or carbon dioxide. If desired, diluents inert to the initial materials, such as small quantities of water, or cyclohexane, benzines, phenols, alcohols of high molecular weight may be added, unsaturated compounds being hydrogenated in many cases during the reaction. By the addition of alcohols the reaction is often facilitated when working with free acids, esters formed thereby being apparently more readily reduced than free acids.

In this manner resin acids, or their derivatives, or substances containing the same, such as abietic acids, pimaric acid, abietic acid esters, for example abietic methyl ester, abietic butyl ester and the like, furthermore abietic acid anhydride or coniferous resins, such as colophony, scrape resin, or mixtures of the said products can be converted into alcohols. Mixtures containing besides a considerable quantity of the aforesaid compounds high molecular fatty acids or their esters, for example glycerides, such as oils or fats, may also be employed as initial material.

The alcohols obtained may find useful application in the production, for example, of artificial waxes or cosmetic preparations. The alcohols may also find useful application for softening natural or synthetic rubber or rubber-like substances, such as gutta-percha, they may be esterified with long chain carboxylic acids, such as montanic acid, for the formation of synthetic waxes. They can also be esterified with low molecular carboxylic acids, such as acetic acid, and the esters may find useful application as assistant solvents in the lacquer or varnish industries or as swelling or gelatinizing agents.

Wax-like esters which can be formed in the process by combination of alcohols obtained by reduction with unreduced acid, may be employed in the place of or in conjunction with dressing or impregnating agents in the textile industry or as assistants in the preparation of polishes.

The following examples will further illustrate how the said invention may be carried out in practice, but the invention is not restricted to these examples. The parts are by weight.

*Example 1*

Cobalt carbonate is activated by the addition of 2 per cent of vanadic acid and treated for 36 hours with hydrogen at 360° C.

Colophony to which 3 per cent of the aforesaid catalyst have been added, is treated with hydrogen at 225° C. while the pressure is kept at 200 atmospheres until hydrogen is no longer absorbed. The catalyst is separated from the hydrogenation product and then the latter subjected to a distillation under diminished pressure. Abietinol is obtained in a good yield as a liquid, yellow resin which distills between 140° and 165° C. at less than 1 millimeter mercury gauge.

*Example 2*

200 parts of colophony to which 20 parts of basic cobalt carbonate have been added are treated at 240° C. in a rotary autoclave while keeping the pressure at 200 atmospheres until hydrogen is no longer absorbed. After separating the reaction product from the catalyst the former is distilled under a pressure of 1 millimeter mercury gauge whereby the alcohol corresponding to the abietic acid contained in the colophony is obtained in a yield of 92 per cent of the theory.

*Example 3*

200 parts of colophony to which have been added 8 parts of copper catalyst (obtained by heating basic copper carbonate, activated by an addition of aluminium hydroxide, at 350° C.) are treated between 250° and 260° C. in a rotary autoclave under a pressure of 200 atmospheres until hydrogen is no longer absorbed. The reaction product obtained is separated from the catalyst and then distilled. The alcohol corresponding to abietic acid passes over between 140° to 165° C. under a pressure of less than 1 millimeter mercury gauge. The yield of the said alcohol amounts to 94 per cent of the theoretical yield. The analysis of the said alcohol (C=83.85 per cent, H=11.09 per cent) shows that the double bonds of the initial material are partially hydrogenated.

In an analogous manner pure abietic acids obtained from colophony or functional derivatives of abietic acids, such as abietic methyl or ethyl esters can be reduced to alcohols.

What I claim is:

1. The process for the production of resin alcohols which comprises heating a natural resinous substance containing a carboxylic group in the liquid state in the presence of hydrogen and of a hydrogenation catalyst under a pressure of at least 30 atmospheres until the saponification value of the initial material is considerably diminished by the formation of substantial quantities of alcohols corresponding to the said carboxylic radicle.

2. The process for the production of resin alcohols which comprises heating a natural resinous substance containing a carboxylic group in the liquid state in the presence of a hydrogenation catalyst under a pressure of hydrogen of at least 100 atmospheres at a temperature between 180° and 350° C. until the saponification value of the initial material is considerably diminished by the formation of substantial quantities of alcohols corresponding to the said carboxylic radicle.

3. The process for the production of resin alcohols which comprises heating a natural resinous substance containing a carboxylic group in the liquid state in the presence of a base metal hydrogenation catalyst at a pressure of hydrogen of at least 100 atmospheres until the saponification value of the initial material is considerably diminished by the formation of substantial quantities of alcohols corresponding to the said carboxylic radicle.

4. The process for the production of resin alcohols which comprises heating a natural resinous substance containing a carboxylic group in the liquid state in the presence of an activated base metal hydrogenation catalyst at a hydrogen pressure of at least 100 atmospheres until the saponification value of the initial material is considerably diminished by the formation of substantial quantities of alcohols corresponding to the said carboxylic radicle.

5. The process for the production of resin alcohols which comprises heating a natural resinous substance containing a carboxylic group in the liquid state in the presence of hydrogen and of a hydrogenating catalyst comprising essentially a metal selected from the group consisting of copper, cobalt and nickel and a small quantity of at least one oxygen-containing compound of the metals of from the 1st to the 7th groups of the periodic system, under a pressure above 100 atmospheres at a temperature between 180° and 350° C. until the saponification value of the initial material is considerably diminished by the formation of substantial quantities of alcohols corresponding to the said carboxylic radicle.

6. The process for the production of resin alcohols which comprises heating a natural resinous substance containing a carboxylic group in the liquid state in the presence of hydrogen and of a base metal hydrogenation catalyst at a pressure of at least 150 atmospheres at a temperature between 200° and 300° C. until the saponification value of the initial material is considerably diminished by substantial quantities of alcohols corresponding to the said carboxylic radicle.

7. The process for the production of resin alcohols which comprises heating a natural resinous substance containing a carboxylic group in the liquid state in the presence of a hydrogenation catalyst essentially comprising cobalt and in the presence of hydrogen under a pressure between 150 and 300 atmospheres and at a temperature between 200° and 300° C. until the saponification value of the initial material is considerably diminished and substantial quantities of alcohols corresponding to the said carboxylic radicle are formed.

8. The process for the production of resin alcohols which comprises heating a natural resinous substance containing a carboxylic group in the liquid state in the presence of a hydrogenation catalyst essentially comprising copper and in the presence of hydrogen under a pressure between 150 and 300 atmospheres and at a temperature between 200° and 300° C. until the saponification value of the initial material is considerably diminished and substantial quantities of alcohols corresponding to the said carboxylic radicle are formed.

9. The process for the production of resin alcohols which comprises heating colophony in the liquid state in the presence of a hydrogenation catalyst comprising essentially a metal selected from the group consisting of copper, cobalt and nickel and in the presence of hydrogen under a pressure between 150 and 300 atmospheres and at a temperature between 200° and 300° C. until the saponification value of the initial material is considerably diminished and substantial quantities of alcohols corresponding to the said carboxylic radicle are formed.

10. The process for the production of resin alcohols by catalytically hydrogenating colophony which comprises heating colophony at a temperature between 200° and 300° C. and under a hydrogen pressure of about 200 atmospheres in the presence of an activated copper-containing catalyst until the resin acids contained in the colophony are substantially converted into resin alcohol.

11. The method of producing a resin alcohol which comprises effecting reduction of a carboxyl group of a natural resin acid to an alcohol group by treatment with hydrogen in the presence of a hydrogenation catalyst and under elevated temperature and pressure.

12. The method of producing a resin alcohol which comprises effecting reduction of a carboxyl group of rosin to an alcohol group by treatment with hydrogen in the presence of a hydrogenation catalyst and under elevated temperature and pressure.

13. The method of producing a resin alcohol which comprises effecting reduction of a carboxyl group of abietic acid to an alcohol group by treatment with hydrogen in the presence of a hydrogenation catalyst and under elevated temperature and pressure.

14. The method of producing a resin alcohol which comprises effecting reduction of a COOH group of a natural resin acid to an alcohol group by treatment with hydrogen in the liquid state in the presence of metallic copper and under elevated temperature and pressure.

15. The method of producing a resin alcohol which comprises effecting reduction of the COOH group of rosin to an alcohol group by treatment with hydrogen in the liquid state in the presence of metallic copper and under elevated temperature and pressure.

16. The method of producing a resin alcohol which comprises effecting reduction of the COOH group of abietic acid to an alcohol group by treatment with hydrogen in the liquid state in the presence of metallic copper and under elevated temperature and pressure.

17. The method of producing a resin alcohol which comprises effecting reduction of a COOH group of a natural resin acid to an alcohol group by treatment with hydrogen in the liquid state in the presence of metallic copper and under a temperature above about 200° C. and a pressure of at least 100 atmospheres.

18. A method of producing resin alcohol which comprises effecting reduction of a carboxyl group of colophony to an alcohol group by treatment with hydrogen in the presence of a hydrogenation catalyst essentially comprising cobalt at a temperature of 225° C. and a pressure of 200 atmospheres.

19. The method of producing a resin alcohol which comprises effecting reduction of a carboxyl group of colophony to an alcohol group by treatment with hydrogen in the presence of a hydrogenation catalyst essentially comprising cobalt at a temperature of 240° C. and a pressure of 200 atmospheres.

20. The method of producing a resin alcohol which comprises effecting reduction of a carboxyl group of colophony to an alcohol group by treatment with hydrogen in the presence of a hydrogenation catalyst essentially comprising copper at a temperature of between 250 and 260° C. and a pressure of 200 atmospheres.

OTTO SCHMIDT.